(12) United States Patent
Lavin

(10) Patent No.: US 8,621,427 B2
(45) Date of Patent: Dec. 31, 2013

(54) CODE MODIFICATION OF RULE-BASED IMPLEMENTATIONS

(75) Inventor: Matt Lavin, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 12/827,540

(22) Filed: Jun. 30, 2010

(65) Prior Publication Data

US 2012/0005649 A1 Jan. 5, 2012

(51) Int. Cl.
*G06F 9/45* (2006.01)

(52) U.S. Cl.
USPC .......................................................... 717/106

(58) Field of Classification Search
USPC .......................................................... 717/106
See application file for complete search history.

(56) References Cited

U.S. PATENT DOCUMENTS

| | | | |
|---|---|---|---|
| 6,324,543 B1 | 11/2001 | Cohen et al. | |
| 6,519,767 B1 * | 2/2003 | Carter et al. | 717/140 |
| 6,851,109 B1 | 2/2005 | Alexander, III et al. | |
| 6,907,546 B1 * | 6/2005 | Haswell et al. | 714/38.11 |
| 7,392,237 B2 * | 6/2008 | Pratt | 707/3 |
| 7,685,313 B1 * | 3/2010 | Kanevsky et al. | 709/246 |
| 2002/0069263 A1 * | 6/2002 | Sears et al. | 709/218 |
| 2004/0181555 A1 * | 9/2004 | Ratner et al. | 707/200 |
| 2004/0215647 A1 * | 10/2004 | Farn et al. | 707/101 |
| 2008/0300851 A1 | 12/2008 | Chakrabarti et al. | |
| 2009/0064137 A1 | 3/2009 | Lavin | |
| 2009/0138550 A1 * | 5/2009 | Pageron | 709/203 |

FOREIGN PATENT DOCUMENTS

| | | |
|---|---|---|
| WO | WO 2005096736 A2 | 10/2005 |
| WO | WO2008089156 | 7/2008 |
| WO | WO2009089294 | 7/2009 |

OTHER PUBLICATIONS

McGacheyaet al., Pervasive Load-Time Transformation for Transparently Distributed Java Preproceedings of BYTECODE 2009, 4th International Workshop on Bytecode Semantics, Verification, Analysis and Transformation European Joint Conferences on Theory and Practice of Software (ETAPS) http://www.cs.purdue.edu/homes/pmcgache/bytecode09.pdf.

McGacheya et al., Classifying Java Class Transformations for Pervasive Virtualized Access http://www.cs.purdue.edu.homes/hosking/papers/gpce09.pdf.

International Search Report and Written Opinion for PCT Application PCT/EP2011//060549, Dated Sep. 27, 2011.

* cited by examiner

*Primary Examiner* — John Chavis
(74) *Attorney, Agent, or Firm* — Grasso PLLC; Fred Grasso

(57) ABSTRACT

Code compatibility provisions are provided. These may include identifying coding that is incompatible with a rule-based environment, searching replacement code solutions for compatible code and identifying a replacement code solution, manipulating the identified incompatible code using the identified replacement code solution, and, after manipulating the incompatible code with the replacement code solution, loading the services across a rule-based environment.

15 Claims, 4 Drawing Sheets

CODE MODIFICATION OF RULE-BASED IMPLEMENTATIONS

BACKGROUND

The present invention relates to application code implemented in a rule-based environment. More specifically, the dynamic analysis and modification of application code run in a rule-based environment such as a server cluster network environment.

Application servers are regularly grouped together such that they provide redundancy and scalability for the applications running thereon and for the clients accessing and using the applications. In redundancy situations, a single server failure may be imperceptible to a client using an application as client services may be transferred from the failed server to a fully functioning server. In scalability situations, the addition of single clients or groups of clients can lead to server overload, so additional servers may be brought online to accommodate peaking or increased workloads associated with additional client work. In this situation as well, the change in server status may be imperceptible to a client.

Applications running in multiserver environments have specific demands placed on them. These may include maintaining session persistence, accounting for common states, providing security, and other factors.

Embodiments of the invention may be directed to rule modifications for applications run in rule-based environments, such as multiserver environments, when the applications may not have been previously intended for such an environment. Embodiments may also be directed to accommodate special or unique demands of multiserver environments or other rules-based environments. Methods, procedures, articles of manufacture, and devices embodying the invention may analyze application code and provide for adjustments to the code. These adjustments may be in an automatic fashion, a manual fashion, or both.

BRIEF SUMMARY

Methods, apparatus, and articles of manufacture may be included in embodiments of the invention. These embodiments can include manufactures, computers, and methods that analyze application code and provide adjustments in an automatic and/or manual fashion when loading the code for a rule-based environment.

The various exemplary instructions, methods, and steps may include: identifying coding that is incompatible with a server cluster environment; searching replacement code solutions for code compatible with a server cluster environment and identifying a replacement code solution; manipulating the identified incompatible code using the identified replacement code solution; and, after manipulating the incompatible code with the replacement code solution, loading the services with the now compatible code, across a cluster server environment. In embodiments the identified code and the replacement code may be bytecode.

Additional instructions and steps in embodiments may include seeking replacement code solutions from a different source after searching replacement code solutions for code but failing to identify a replacement code solution. In certain embodiments, the different source may be a system administrator. The additional instructions and steps may also include developing a replacement code solution by calling and applying a code compatibility algorithm.

Still further, additional embodiments may also include providing code, identified as incompatible, to a system administrator and checking for instructions to disregard a replacement code solution for the code identified as incompatible to the system administrator.

As provided and taught herein, these and other embodiments of the invention are possible.

DETAILED DESCRIPTION

Figure 1:
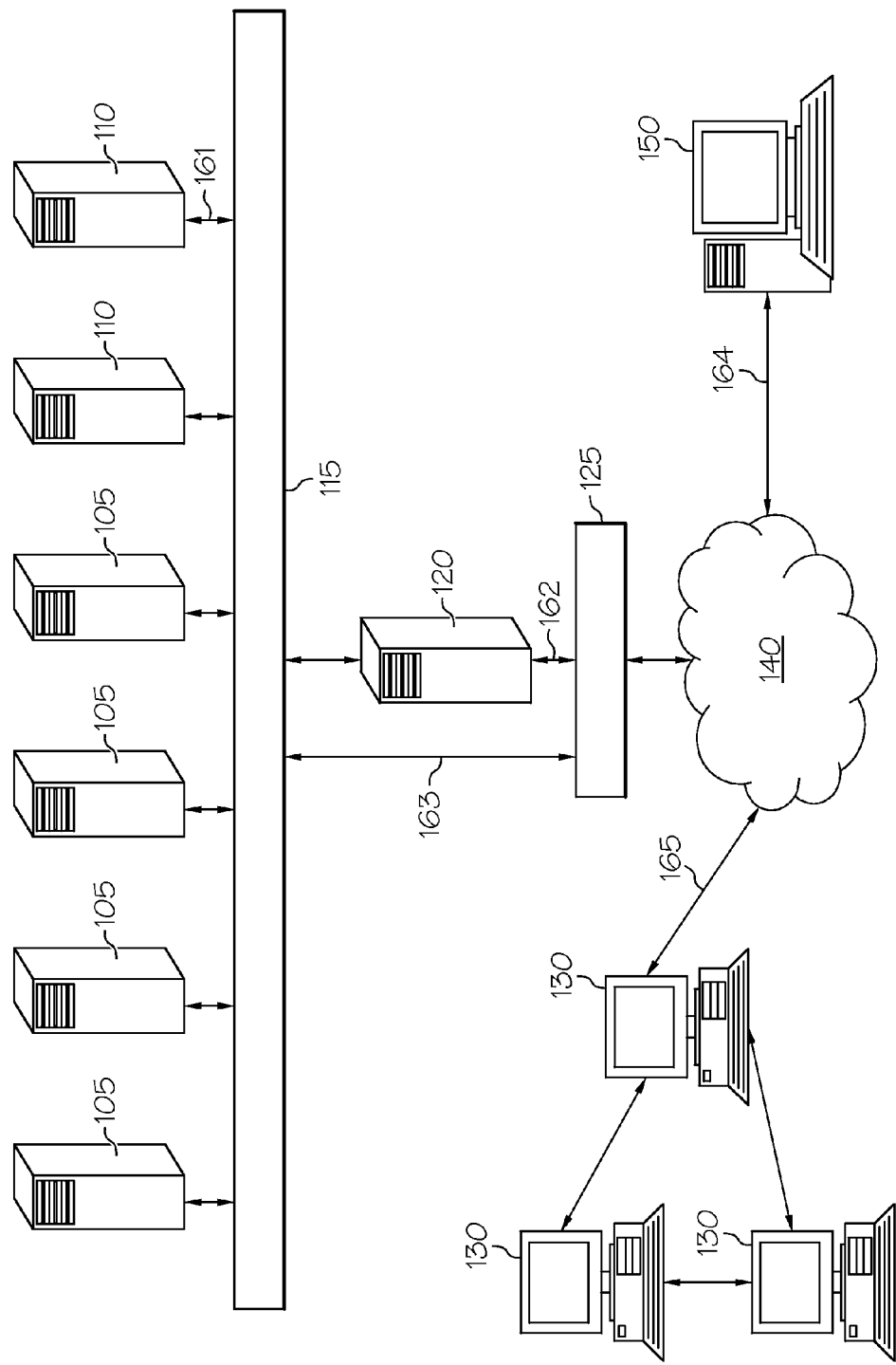
FIG. 1 shows clients, servers, and networks, as may be employed in accord with embodiments of the invention.

Embodiments include systems, methods, apparatus, and articles of manufacture that selectively analyze and update applications being loaded and run in a rule-based environment, such as a cluster or multiserver environment. In embodiments, an application which may or may not be regarded as having been vetted for use by a cluster of servers, may be analyzed and considered during load time for anomalies that may affect the efficiency or efficacy of the application to be run in a multiserver environment. This vetting may include, during the loading process, considering and analyzing compiled code, flagging possibly problematic compiled code, making provisions to repair the flagged compiled code, repairing the compiled code, and loading the updated application across a cluster of servers. The provisions to repair the loading code may be both automatic and manual. In a java environment, the analysis and modification may be done to bytecode.

The automatic provisions may include searching for and identifying known inconsistencies or incompatibilities in code that act to undermine the ability of the code to run in a multiserver environment. These inconsistencies can include a failure to track and store session properties for clients, making calls outside of certain objects or classes available to a server, and other problems as well. In one example, when a state is maintained between provided services, an incompatible application may have difficulty maintaining that state if two different servers are providing the services. With this potential conflict, as well as with others, a code revision engine may be used to rewrite or replace the incompatible code such that the code would maintain state between service runs.

In embodiments, a code revision engine resident on a server or elsewhere may be employed to automatically analyze and consider bytecode during application loading processes. When the analyzed bytecode maintains state or otherwise runs in a manner inconsistent with a multiserver environment, the bytecode may be flagged and rewritten. Rewriting the code may include selecting from stored replacement code at the code revision engine or elsewhere, and supplementing or amending the incompatible code with the stored replacement code. In certain embodiments, some stored code or automatic metrics for rewriting incompatible code may not be available or feasible. In these situations, along with making feasible automatic code replacements, manual intervention may also be provided. Thus, in some embodiments, administrator intervention and automatic bytecode modification may each be used to have applications that were previously considered to be solely compatible with a single server environment, run in a multiserver environment.

In embodiments, such as those having a collection of web service implementations, a web service container may be used to distribute the execution load across a cluster of machines even if some of the implementations might not have been written in a cluster friendly or compatible manner. An example of this may surround the use of IBM's Websphere™ application, which allows for the distributive execution of web services and EJBs across a cluster to provide scalability. However, when this distribution is provided under the assumption that each implementation is properly designed for execution in a cluster, running the implementations may result in incorrect execution, corrupted information, or security violations. As a resolution, a master application server may be used to analyze the implementation of the Websphere™ services when they are loaded and dynamically apply bytecode manipulation to fix the coding mistakes that would retard or prevent the service from being clusterable.

In embodiments, services that have been implemented in a cluster compatible fashion may require no modification and may be deployed as is. Conversely, where services with incompatible practices are detected, they may be re-written when loaded to patch the incompatible code with known solutions. Thus, in embodiments, a service that was written without following a set of clustering coding practices, may be deployed in a clustered or other rule-based environment.

FIG. 1 shows a system of servers, networks, clients, administrators, and firewalls that may be employed in accord with embodiments of the invention. As can be seen in FIG. 1, clients 130 may be connected to each other and to a network 140. Administrator 150 may also be connected to network 140. A firewall 125 may sit between server 120, servers 105, and storage 110. Firewalls may also be present between the administrator 150 and the network 140 as well as between the clients 130 and the network 140. Also, while not shown in FIG. 1, administrator 150 and the clients 130 may also have access to and may be connected with network 115.

In embodiments, the primary server 120 may be loading a web application that assists clients 130. In embodiments, the primary server 120 may contain a dynamic code compatibility engine such that as the application is loaded by the primary server, the code engine may take steps to accommodate having the application loaded onto and across secondary servers 105. As the primary server loads the application, the code engine may consider the code being loaded and when incompatible code is identified, replacement code stored in network storage 110, may be used to replace the incompatible code. This identification, query and replacement may continue until the entire application is reviewed by the code engine and each incompatibility has been replaced with substitute code from the network storage 110. Once the substitutions are complete, the primary server 120 may finalize loading of the application across it and the secondary servers 105.

In this and other embodiments operating in an object oriented code environment, the primary server may contain each of the classes required to execute each applicable service request. However, the server may seek to distribute some service execution to secondary machines to support a larger load or for other reasons. This distribution may include use of previously programmed distribution services that apply known methodologies for delegating the execution of service requests to secondary servers. This distribution may also include the use of APIs for services to use and enable behavior in the cluster where the services may include a distributed locking API and a distributed cache API.

Figure 2:
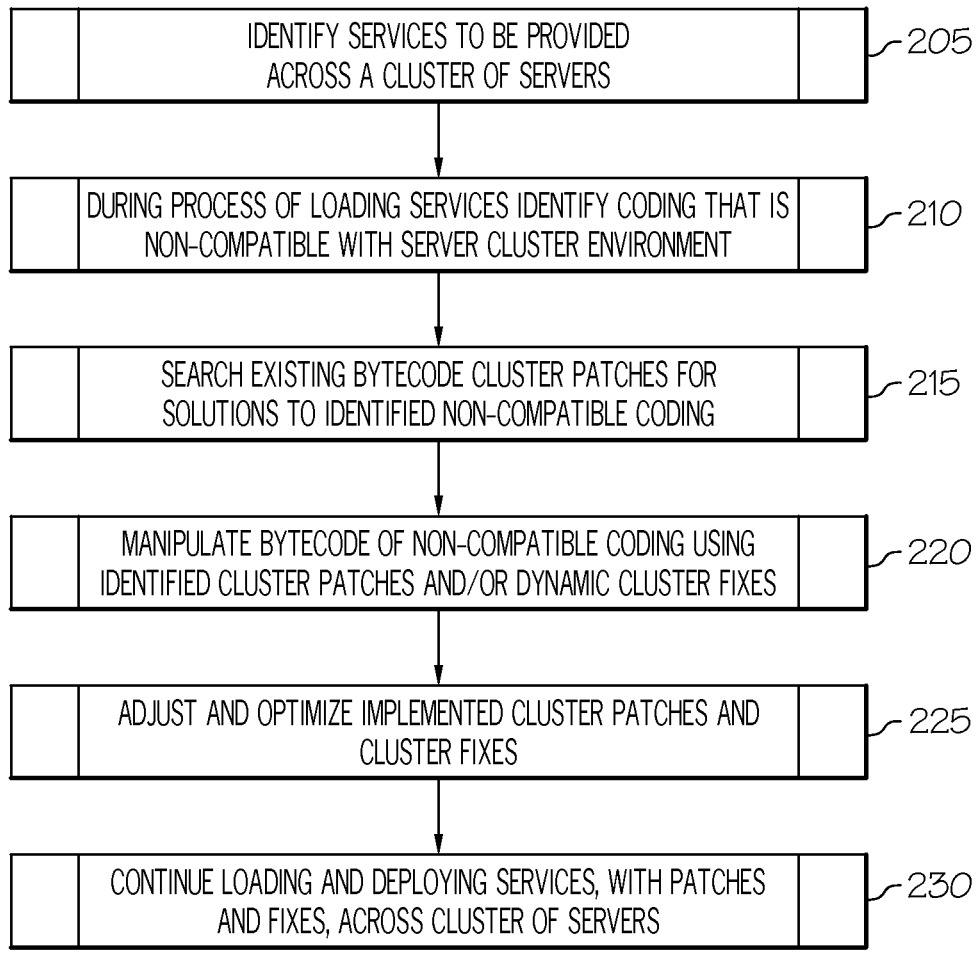
FIG. 2 shows a method as may be employed while loading an application in a rule-based environment in accord with embodiments of the invention.

FIG. 2 shows a method as may be employed in accord with embodiments of the invention. The actions described herein are exemplary and may include additional or fewer steps and may be performed in this as well as other orders. In embodiments, as shown at 205, services may be identified and considered for use across a cluster of servers. As these services are loaded, as shown at 210, they may be analyzed to identify coding that is noncompatible with a server cluster or other rule-based environment. As noncompatible code is identified, as shown at 215, code cluster patches may be identified and applied as solutions for the identified noncompatible code. As shown at 220, the noncompatible code may be manipulated such that they serve as patches and dynamic cluster repairs for the noncompatible code. Having been modified, as shown at 225, the cluster patches and fixes may be adjusted and optimized. Finally, as shown at 230, the loading of the application code may continue such that the services associated with the application, along with the patches and fixes, may be deployed across a cluster of machines or servers.

Figure 3:
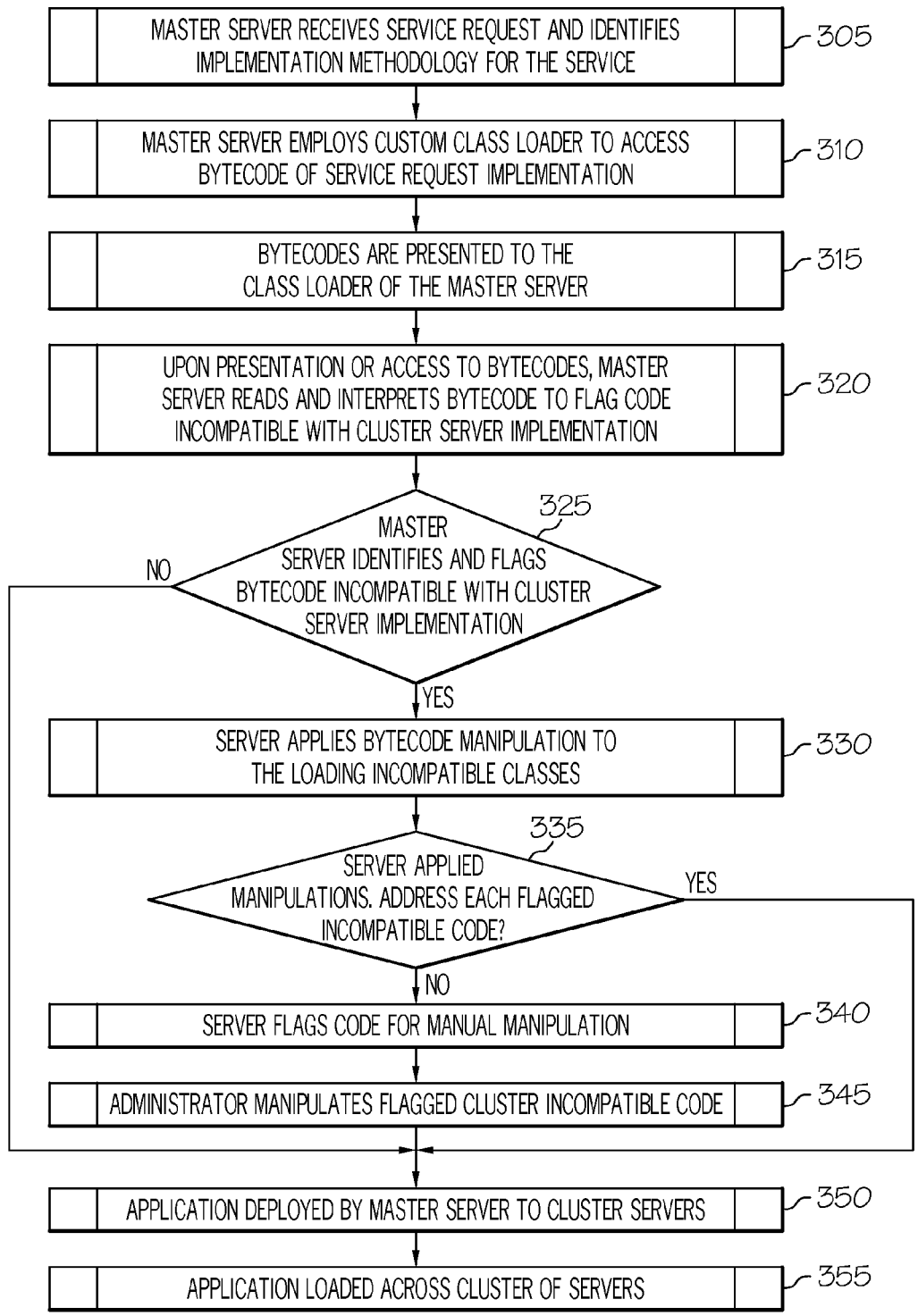
FIG. 3 shows a method as may be employed while loading an application across multiple servers in accord with embodiments of the invention.

FIG. 3 shows a method as may be employed in accord with embodiments of the invention. Shown at 305 of FIG. 3, a master server may receive the service request and identify implementation methodology for the service to be run on the master server and secondary servers. As shown at 310, the master server may employ a custom class loader to access bytecode of the service request implementation. The bytecode may be presented to the class loader of the master server, as shown at 315. Next, as shown at 320, upon presentation of the bytecodes, it may be read in order to flag code incompatibilities with the cluster server implementation. If incompatibilities are found, the server may apply bytecode manipulation to the incompatible classes being loaded, as shown at 330. This manipulation may include classifying the code incompatibility and searching compatibility databases for known fixes to the classification attributed to the incompatible code. If incompatibilities are not found, the application may be deployed by the master server to cluster servers as shown at 350.

As a server applies the bytecode manipulations at 330, the server may track whether or not each indentified incompatibility has been addressed and resolved. If each incompatibility has been addressed, as shown at 335, then the application may be deployed by the master server to cluster servers, as shown at 350. If certain manipulations have not been properly employed or cannot be verified as having been properly employed, the server may flag these incompatible bytecode segments for manual manipulation.

Having received a flag or signal that manual intervention may be required, an administrator, as shown at 345, may manipulate the flagged incompatible code to make it compatible with a cluster-server environment. Having made such a manipulation, the administrator may alert the server that the code has been vetted and may be deemed compatible. This action is shown at 350. Upon receiving such notice, the application may be deployed by the primary server to the secondary servers. As such, in each of the three different scenarios, the application may be deployed from the primary server to the secondary servers and, thus, loaded across a cluster of servers. This loading is reflected at 355.

In embodiments, when the primary server receives a service request it may initially look up the implementation of that service. By using a custom class loader, the server may load and obtain access to the bytecodes of the implementation. When the bytecodes are presented to the class loader of the server, the server may manually read and interpret the bytecodes of the implementation to find cluster incompatible code. The server may then apply bytecode manipulation to the classes when cluster incompatible code is found, and that manipulation would act to remove incompatibilities in the code such that the code may be deployable across the cluster.

As a specific example, where a service implementation consists of a single method on a single class. A possible 'addition' service might be generally implemented as follows:

```
public class Adder {
    public int add (int first, int second) {
        return first + second;
    }
}
```

Interpreting the bytecodes for this service would reveal that it may be considered clusterable as the output of the service is dependent only on the inputs to the service. Two calls with the same arguments will result in the same value, and will not interact with each other. When the server decides that it is clusterable, it could distribute that service to any secondary machines available without modification.

However, a different service might be implemented as follows:

```
public class Counter {
    private int counter = 0;
    public int getValueAndIncrement( ) {
        return counter++;
    }
}
```

Interpreting the bytecodes for this service, a code engine may find that this service is not cluster compatible as this service would only behave consistently if it was always executed in the same virtual machine because the service maintains state between service calls (the counter variable). If this code was distributed in a cluster the results from multiple service calls would not be always increasing, but would sometime repeat and not proceed in order.

Thus, in embodiments, the code engine could potentially re-write the bytecodes to have the following changes:

```
public class Counter {
    private SharedInteger counter =
ApplicationServerAPI>.getSharedInteger(Counter.class, "counter");
    public int getValueAndIncrement( ) {
        return counter.incrementAndReturn( );
```

Accordingly, details regarding how an integer reference is made may be replaced with a shared integer object. This implementation may vary for each application server, and could potentially vary based on the features installed or the setup of a specific server.

In embodiments, the code engine may search for and employ substitutions that leverage current code solutions or revised code solutions given the environment that the application would be installed into. In more complex examples, the code engine embodying the invention may need to detect the code for maintaining state between service executions. When the complexity of real service implementations results in no previously stored solutions being available, or in inconclusive results as to compatibility, users may be allowed to override code that is considered cluster compatible such that complex but safe code may not be modified. When code is deemed not compatible by a user after being flagged as possibly being incompatible and having no stored solution, a user based solution may be employed. Such a solution is set out in published U.S. patent application 20090064137.

Figure 4:
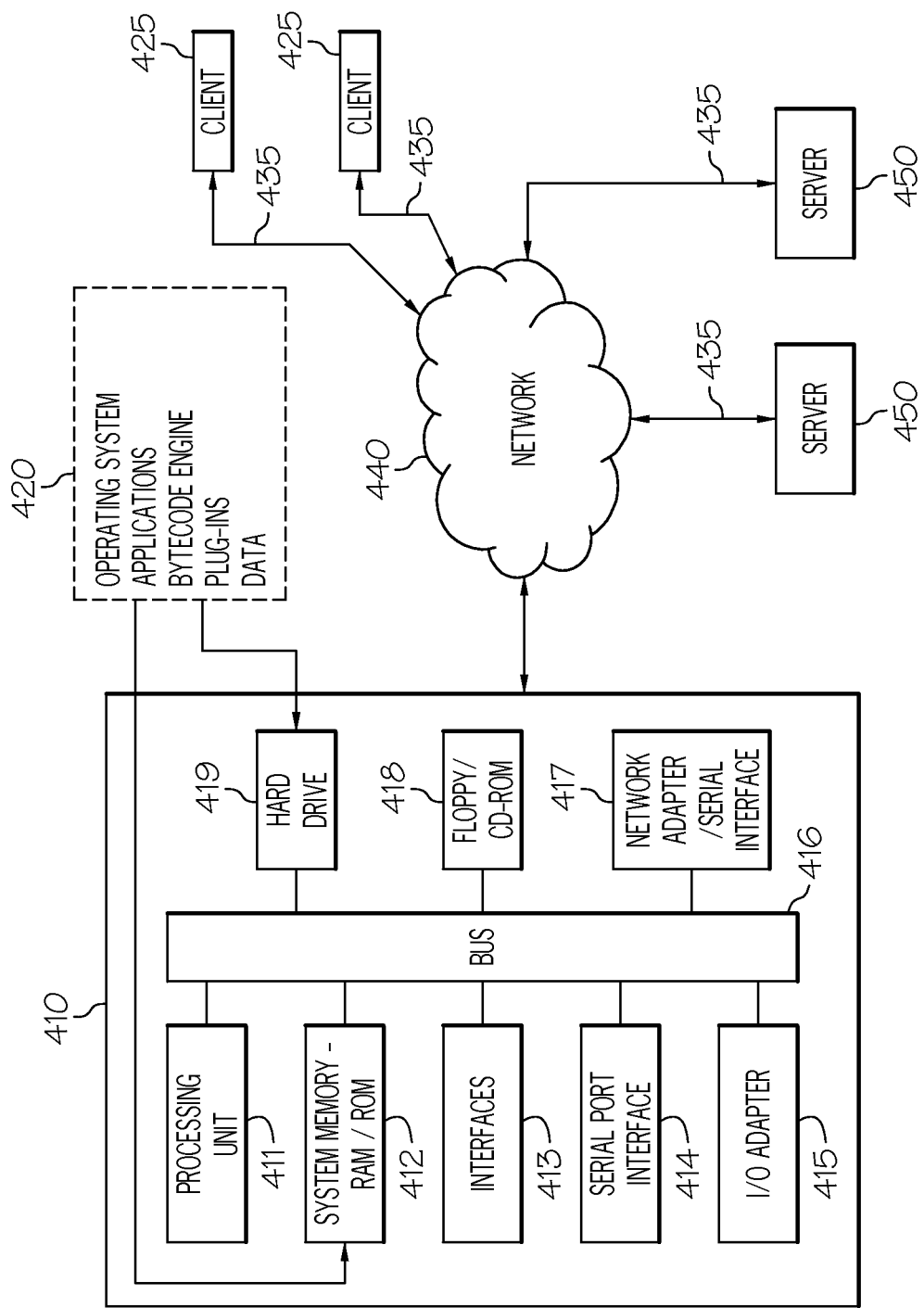
FIG. 4 shows a networked system as may be employed when loading or running multiserver applications in accord with embodiments of the invention.

FIG. 4 shows a primary server, secondary servers, a network, and clients, as may be employed in accord with embodiments. The primary application server 410 is shown connected to network 440, which is in-turn connected to servers 450 and clients 425. As can be seen, the primary application server 410 may contain a processing unit, system memory 412, interfaces 413, serial port interfaces 414, an I/O adapter 415, a hard drive 419, removable storage 418, and a network adapter 417. Each of these components may themselves be connected to each other via a bus 416. Code to be implemented by the primary application server 410 may be stored in both the system memory 412 and the hard drive 419. As can be seen at 420, the code in memory may include operating system applications, the bytecode engine, plug-ins, and data, which can include the code cluster patches.

While it is understood that process software embodying the invention may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

What is claimed is:

1. An article of manufacture comprising:
a non-volatile computer readable medium, the computer readable medium storing instructions thereon for analyzing programming application code being provided for execution across a cluster of servers, the instructions, which when executed, comprising:
during the process of loading services, identifying program application coding that is incompatible with a server cluster environment;
searching replacement code solutions for program application code compatible with a server cluster environment;
after searching replacement code solutions, identifying a replacement code solution;
manipulating the identified incompatible program application code using the identified replacement code solution; and
after manipulating the incompatible program application code with the replacement code solution, to render the incompatible program application code compatible, loading the services, with the now compatible program application code, across a cluster server environment.

2. The article of claim 1 wherein the identified program application code is bytecode and wherein the replacement code solution is bytecode.

3. The article of claim 1 storing instructions, which when executed, further comprise:
after searching replacement code solutions for the identified incompatible program application code and failing to identify a replacement code solution, seeking replacement program application code solutions from a different source.

4. The article of claim 3 wherein the services are loaded onto a server and wherein the different source is a server administrator.

5. The article of claim 1 storing instructions, which when executed further comprise:
developing a replacement code solution by calling and applying an application code compatibility algorithm.

6. The article of claim 1 storing instructions, which when executed, further comprise:
providing program application code, identified as incompatible, to a system administrator; and
checking for instructions to disregard a replacement code solution for the program application code identified as incompatible to the system administrator.

7. The article of claim 1 wherein identifying coding includes considering bytecode and wherein the bytecode is presented to the class loader of a primary server.

8. A computer comprising:
a non-volatile computer readable medium, the computer readable medium storing instructions thereon for analyzing program application code being provided across a cluster of servers, the instructions, which when executed, comprising:
identifying program application coding, during the process of loading services to a server cluster environment, that is incompatible with a server cluster environment;
searching replacement code solutions for program application code identified as compatible with a server cluster environment;
identifying a replacement code solution;
manipulating the identified incompatible program application code using the identified replacement code solution; and
after manipulating the incompatible program application code with the replacement code solution, to render the identified incompatible program application code compatible, loading the services, with the now compatible program application code, across a cluster server environment.

9. The computer of claim 8 wherein the identified program application code is bytecode and wherein the replacement code is bytecode.

10. The computer of claim 8 storing instructions, which when executed, further comprise:
after searching replacement code solutions for the identified incompatible program application code and failing to identify a replacement code solution, seeking replacement program application code solutions from a different source.

11. The computer of claim 10 wherein the different source is a system administrator.

12. The computer of claim 8 storing instructions, which when executed further comprise:
developing a replacement code solution by calling and applying a code compatibility algorithm.

13. The computer of claim 8 storing instructions, which when executed, further comprise:
providing program application code identified as incompatible to a system administrator; and
checking for instructions to disregard a replacement code solution for the program application code identified as incompatible to the system administrator.

14. A computer server comprising:
a processor and related processor storage, the processor configured to carry out program application code which causes the processor to perform steps comprising:
receive a service request and identify program application code of the implementation methodology for the service request;
employ a class loader to access bytecode of the program application code of the implementation methodology received for the service request;
present the bytecode of the program application code to the custom class loader;
identify bytecode of the program application code that is incompatible with a cluster server environment;
manipulate identified incompatible bytecode of the program application code to become compatible with a cluster server environment; and
deploy manipulated bytecode of the program application cod to cluster of servers for loading across the cluster of servers.

15. The computer of claim 14 wherein the steps performed further comprise:
flagging incompatible program application code for manual manipulation by a user; and
receiving manually manipulated program application code from a user before deploying manipulated bytecode to the cluster of servers for loading across the cluster of servers.

* * * * *